US012654368B2

(12) United States Patent
Ricci et al.

(10) Patent No.: US 12,654,368 B2
(45) Date of Patent: Jun. 16, 2026

(54) CAST ELASTOMERS WITH TUNABLE MATERIAL PROPERTY DEVELOPMENT

(71) Applicant: ACUSHNET COMPANY, Fairhaven, MA (US)

(72) Inventors: Shawn Ricci, New Bedford, MA (US); Michael Michalewich, Norton, MA (US); Robert Blink, Newport, RI (US)

(73) Assignee: ACUSHNET COMPANY, Fairhaven, MA (US)

( * ) Notice: Subject to any disclaimer, the term of this patent is extended or adjusted under 35 U.S.C. 154(b) by 238 days.

(21) Appl. No.: 18/454,379

(22) Filed: Aug. 23, 2023

(65) Prior Publication Data

US 2025/0065540 A1 Feb. 27, 2025

(51) Int. Cl.

| | |
|---|---|
| ***B29C 39/10*** | (2006.01) |
| ***A63B 37/00*** | (2006.01) |
| ***B29C 39/36*** | (2006.01) |
| ***B29C 67/24*** | (2006.01) |
| ***B29L 31/54*** | (2006.01) |

(52) U.S. Cl.

CPC .......... *B29C 39/10* (2013.01); *A63B 37/0023* (2013.01); *B29C 39/36* (2013.01); *B29C 67/246* (2013.01); *A63B 37/0024* (2013.01); *A63B 2209/00* (2013.01); *B29L 2031/546* (2013.01)

(58) Field of Classification Search

None

See application file for complete search history.

(56) References Cited

U.S. PATENT DOCUMENTS

| | | | | |
|---|---|---|---|---|
| 2008/0125247 | A1* | 5/2008 | Rajagopalan | C08G 18/5024 473/373 |
| 2014/0079940 | A1* | 3/2014 | Liyanage | C08J 9/149 521/170 |
| 2021/0187357 | A1* | 6/2021 | Ricci | A63B 37/0076 |

* cited by examiner

*Primary Examiner* — John J DeRusso

(74) *Attorney, Agent, or Firm* — Finnegan, Henderson, Farabow, Garrett & Dunner, LLP

(57) ABSTRACT

A method for manipulating a cure profile of an elastomer is disclosed. The method may include providing a formulation comprising an isocyanate prepolymer, a curative, a first catalyst, and a second catalyst. The method may further include curing the formulation by initiating a front-end cure reaction between the isocyanate prepolymer and the curative with the first catalyst. The method may further include decreasing a rate of a back-end cure reaction between the isocyanate prepolymer and the curative using the second catalyst, wherein the second catalyst does not impact the front-end cure reaction.

18 Claims, 3 Drawing Sheets

CAST ELASTOMERS WITH TUNABLE MATERIAL PROPERTY DEVELOPMENT

TECHNICAL FIELD

The present disclosure relates generally to a method for casting elastomers to improve control of material property development at different process steps during manufacturing. More particularly, the present disclosure provides a method to manipulate a golf ball cover cure profile.

BACKGROUND

The performance of a golf ball is affected by a variety of factors including the materials, weight, size, dimple pattern, and external shape of the golf ball. As a result, golf ball manufacturers are constantly improving or tweaking the performance of golf balls by adjusting the materials and construction of the ball as well as the dimple pattern and dimple shape.

Golf balls generally comprise a core surrounded by a cover and optionally intermediate layers there between. The core and/or the cover may incorporate multiple layers and the core may be solid or have a fluid-filled center surrounded by windings and/or molded material. The cover forms a spherical outer surface, typically includes a plurality of dimples, and may be formed from a variety of materials depending on the desired cover properties and overall golf ball performance characteristics being targeted. Additionally, one or more coating layers may surround the cover.

While the golf ball core significantly influences the overall performance of a finished golf ball, the cover layer may also have a significant influence on aerodynamic behavior and golf ball performance. Thus, the cure profile associated with the cover layer material(s) can negatively affect performance and/or production efficiencies. For example, a cover layer molded at an inopportune time during curing may be left with an uneven dimple structure negatively impacting golf ball performance. Similarly, a paint layer on the cover may impact golf ball performance. A cover layer poorly susceptible to receiving paint during processing may result in an unevenly applied paint layer. This may also negatively impact golf ball performance and result in decreased trajectory.

Different materials, and procedures may be used in constructing a golf ball cover layer. The materials used, however, may impart different effects to the golf ball. For example, one material may be suitable for its mechanical strength, but it may receive paint poorly and contain undesired deposits of paint as described above. Another cover material may evenly receive paint, but it may be difficult to manipulate mechanically to apply dimples or to apply any additional layers. The cure profile of the material(s)s used can thus impact such processing steps.

Throughout the process of casting a cover material, from molding the cover onto a golf ball core or sub-layer assembly, to then further processing the golf ball with a cover, the cover material is continuously curing. As the cover cures, the hardness may increase and influence the efficacy of different processing steps involved in forming a completed golf ball product. For example, depending on the chemicals included in the cover material, a short cure duration of the cover may impact efficiency in applying the cover to the golf ball core or sub-layer assembly, buffing the connecting line, applying a subsequent layer to the cover, or manipulating the surface of the cover. Furthermore, a long cure duration of the cover may undesirably reduce production efficiency or may render a particular cover material unusable for subsequent processing.

Accordingly, there remains an unmet need for a processing method to design a tunable cure profile for golf ball cover layers, and elastomers overall. The present disclosure thus provides a method to manipulate a cure profile of a golf ball cover layer to improve tunability of the cover layer mechanical properties for subsequent processing.

SUMMARY

The embodiments provided herein disclose a method for casting elastomers to improve control of material property development at different process steps during manufacturing, and more particularly, a method to manipulate a golf ball cover cure profile.

In some embodiments, the present disclosure provides a method of manipulating a cure profile of an elastomer. An exemplary method may comprise providing a formulation comprising an isocyanate prepolymer, a curative, a first catalyst, and a second catalyst. The method may further include, consistent with disclosed embodiments, initiating a front-end cure reaction between the isocyanate prepolymer and the curative with the first catalyst, and decreasing a rate of a back-end cure reaction between the isocyanate prepolymer and the curative using the second catalyst while avoiding an impact on the front-end cure reaction. The front-end cure reaction may be completed within 2 hours. The curative may contain at least one selected from the group of an amine-based curative, a hydroxyl-based curative, and combinations thereof. The amine-based curative may comprise at least one of Ethacure 300, Ethacure 100, Unilink 4200, Versalink, Omicure 33DS, MXDA, or MOCA. The hydroxyl-based curative may comprise at least one of CAPA 3031, CAPA 3090, CAPA 4101, PPG, PTMEG, 1,4 BDO, or 1,6 hexane diol. The second catalyst may be a delay catalyst. The second catalyst may be a negative catalyst The second catalyst may extend a cure time of the elastomer. The first catalyst may be an organic-based catalyst comprising at least one of oleic acid, fumaric acid, benzoic acid, octanoic acid, oxalic acid, crotonic acid, or acetic acid The second catalyst may be a metal-based catalyst comprising at least one of bismuth catalyst, zinc octoate, stannous octoate, dibutyl tin dilaurate, bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, di-n-octyltin bis-isooctyl mercaptoacetate, Niax A-300, or Niax A-400.

In some embodiments, the present disclosure discloses a method of forming a golf ball cover. An exemplary method may include the steps of providing a golf ball comprising at least one core layer and providing a formulation comprising an isocyanate prepolymer, a curative, a first catalyst, and a second catalyst. The method may further include, for example, casting a cover from the formulation about the golf ball wherein the formulation cures by the first catalyst initiating a front-end cure reaction between the isocyanate prepolymer and the curative, demolding the golf ball once the front-end cure reaction is completed, and performing a manufacturing process step to the cover during a back-end cure reaction between the isocyanate prepolymer and the curative, wherein the second catalyst decreases a rate of the back-end cure reaction of the formulation while avoiding an impact on the front-end cure reaction.

Consistent with disclosed embodiments, the front-end cure reaction may be completed within 2 hours. Moreover, the curative may contain at least one selected from the group of a hydroxyl-based curative, an amine-based curative, and combinations thereof. The amine-based curative may comprise at least one of Ethacure 300, Ethacure 100, Unilink 4200, Versalink, Omicure 33DS, MXDA, or MOCA. The hydroxyl-based curative may comprise at least one of CAPA 3031, CAPA 3090, CAPA 4101, PPG, PTMEG, 1,4 BDO, or 1,6 hexane diol. The second catalyst may be a delay catalyst. The second catalyst may be a negative catalyst. The second catalyst may extend a time window for chemical processing to the golf ball cover. The manufacturing process step may comprise adding a layer to the golf ball cover or mechanically manipulating the shape or surface of the golf ball cover. The added layer may be a paint layer. The first catalyst may be an organic-based catalyst comprising at least one of oleic acid, fumaric acid, benzoic acid, octanoic acid, oxalic acid, crotonic acid, or acetic acid. The second catalyst may be a metal-based catalyst comprising at least one of bismuth catalyst, zinc octoate, stannous octoate, dibutyl tin dilaurate, bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, di-n-octyltin bis-isooctyl mercaptoacetate, Niax A-300, or Niax A-400.

BRIEF DESCRIPTION OF DRAWING(S)

Further features and advantages of the disclosure can be ascertained from the following detailed description that is provided in connection with the drawings described below:

DETAILED DESCRIPTION

Figure 1:
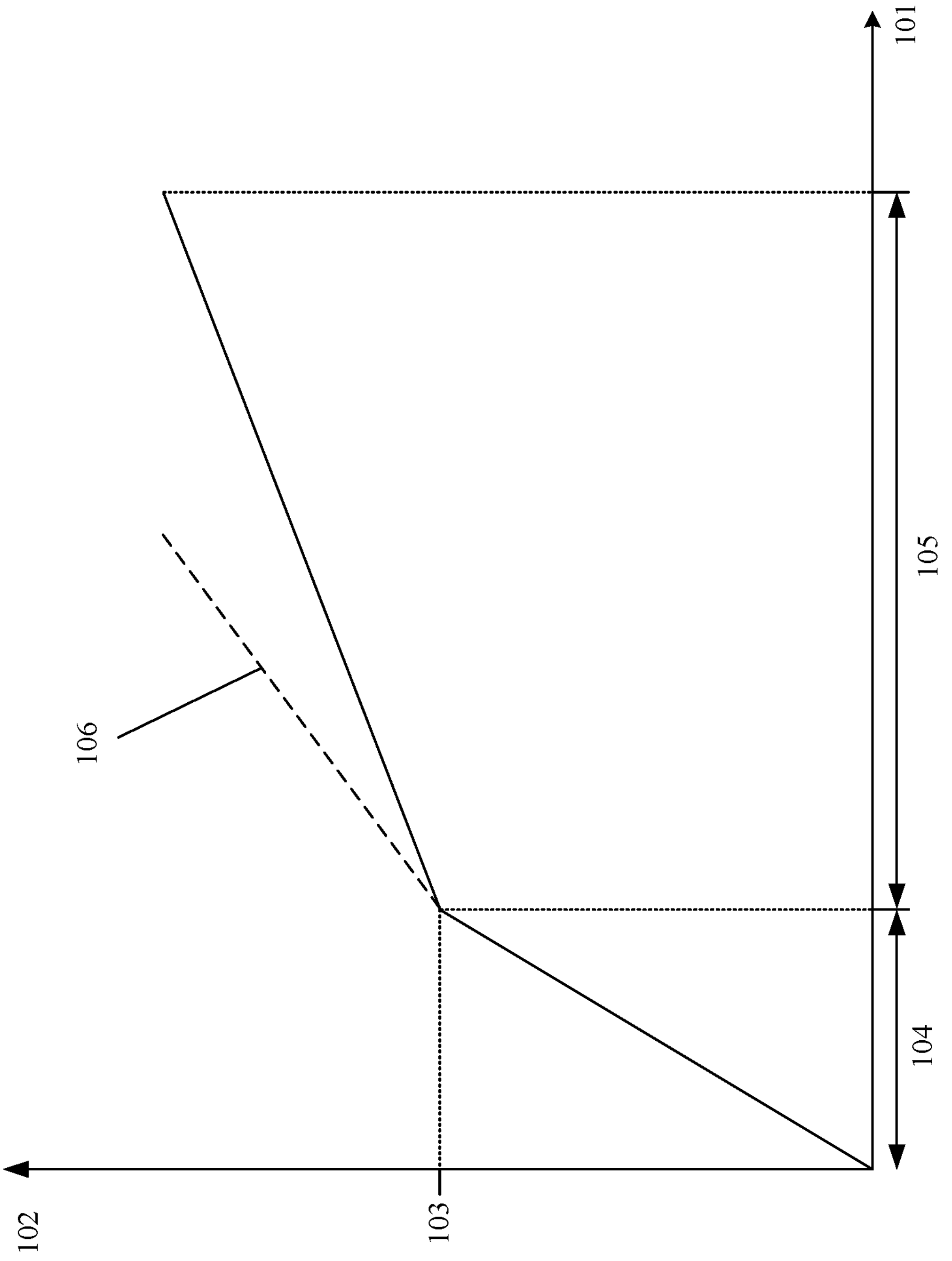
FIG. 1 is a material property profile plotted over cure time for a formulation, consistent with embodiments of the present disclosure.

The present disclosure relates to methods for manipulating a cure profile of an elastomer to improve control over material property development. For example, disclosed methods may include forming a golf ball cover with tunable material property development.

Different materials may be used in golf ball cover layer constructions to impart specific properties and playing features to the ball. For example, ionomer compositions including an ethylene acid copolymer containing acid groups that are at least partially neutralized can be used to make golf ball cover layers. Ethylene acid copolymers that may be used to form the golf ball cover layer may be generally described as copolymers of ethylene; C3 to C8 α, β-ethylenically unsaturated mono- or dicarboxylic acid; and optional softening monomer. Commercially available ionomer compositions that may be used to make golf ball cover layers include Surlyn® (DuPont) and Escor® and Iotek® (Exxon) ionomers.

Recently, polyurethane compositions have been used to make golf ball covers. Polyurethane is a polymer material formed by reacting diisocyanate with a polyol to create a urethane linkage between the diisocyanate and polyol. For purposes of this disclosure, polyurethane compositions contain urethane linkages between an isocyanate group (—NC(═O)) and a hydroxyl group (—OH). This reaction occurs in the presence of a catalyst and other additives. The chain length of the polyurethane polymer may be extended by additional reactions with hydroxyl-terminated and amine curing agents.

Different molding procedures may be used to form the cover over the core or sub-layers of the ball. Non-limiting examples include compression-molding, casting, and injection molding processes. Such examples normally use molds having an upper and a lower mold cavity that is hemispherical in shape and one-half the size of a finished golf ball. The mold cavities contain interior walls that define a dimple pattern of the golf ball cover layer to be produced. The polyurethane material is placed in the upper and lower mold cavities and the golf ball core or sub-layer assembly is placed within one of the molds. The upper and lower molds are put together to connect an upper portion and a lower portion of the cover layer onto the golf ball core or sub-layer assembly. A connecting line at the connection point between the upper and lower portion of the cover may be buffed away, and the golf ball may undergo further processing.

Cover layers of the present disclosure may be made of a polyurethane composition. As noted above, polyurethanes contain urethane linkages by reacting an isocyanate group (—N═C═O, or NCO) with a hydroxyl group (—OH). The polyurethanes are produced by the reaction of a multi-functional isocyanate (NCO—R—NCO) with a long-chain polyol having terminal hydroxyl groups (—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units because they can be polymerized to produce polymeric isocyanates containing two or more monomeric isocyanate repeat units. The isocyanate compound may have any suitable backbone chain structure including, but not limited to, saturated, unsaturated, linear, branched, or cyclic. These isocyanate compounds may also be referred to as polyisocyanates or multi-functional isocyanates. The term "polyamine" as used herein may be understood to mean any aliphatic or aromatic compound containing two or more primary or secondary amine functional groups. The polyamine compound may have any suitable backbone chain structure including, but not limited to, saturated, unsaturated, linear, branched, or cyclic. The term "polyamine" may be used interchangeably with "amine-terminated component." Polyamines may also be referred to as amine compounds or multi-functional amines. The term "polyol" as used herein may be understood to mean any aliphatic or aromatic compound containing two or more hydroxyl functional groups. The term "polyol" may be used interchangeably with hydroxy-terminated component. The term "polyimine compound" may be understood to mean any aliphatic or aromatic compound containing two or more imine functional groups. Polyimines may also be referred to as imine compounds or multi-functional imines.

Aromatic polyurethanes may be prepared in accordance with the present disclosure and cover layers may be formed by reacting an aromatic diisocyanate with a polyol. Suitable aromatic diisocyanates that may be used according to the present disclosure include, but are not limited to, toluene 2,4-diisocyanate, toluene 2,6-diisocyanate, 4,4'-methylene diphenyl diisocyanate, 2,4'-methylene diphenyl diisocyanate, polymeric methylene diphenyl diisocyanate, p-phenylene diisocyanate, m-phenylene diisocyanate, naphthalene 1,5-diisocyanate, naphthalene 2,4-diisocyanate, p-xylene diisocyanate, and homopolymers, copolymers, or blends thereof. The aromatic isocyanates can react with the hydroxyl or amine compounds and form a durable and tough polymer having a high melting point. The resulting polyurethane generally has good mechanical strength and cut/shear resistance.

Aliphatic polyurethanes also can be prepared in accordance with the present disclosure and may be formed by reacting an aliphatic diisocyanate with a polyol. Suitable aliphatic diisocyanates may include, but are not limited to, isophorone diisocyanate, 1,6-hexamethylene diisocyanate, 4,4'-dicyclohexylmethane, diisocyanate, metatetramethylxylyene diisocyanate, trans-cyclohexane diisocyanate, and homopolymers, copolymers, or blends thereof. An exemplary multi-functional isocyanate may include trimers of HDI or H12 MDI, oligomers, or other derivatives thereof.

A polyol available to one of ordinary skill in the art may be suitable according to embodiments of the present disclosure. Exemplary polyols may include, but are not limited to, polyether polyols, hydroxy-terminated polybutadiene, polyester polyols, polycaprolactone polyols, and polycarbonate polyols. The hydroxy-terminated polybutadiene may include partially and/or fully hydrogenated derivatives. In some embodiments, the polyol includes polyether polyol. In some embodiments, the polyol may be polytetramethylene ether glycol (PTMEG), polyethylene propylene glycol, polyoxypropylene glycol, or mixtures thereof. The hydrocarbon chain can have saturated or unsaturated bonds and substituted or unsubstituted aromatic and cyclic groups.

In some embodiments, polyester polyols may be included in the polyurethane material. Suitable polyester polyols include, but are not limited to, polyethylene adipate glycol, polybutylene adipate glycol, polyethylene propylene adipate glycol, o-phthalate-1,6-hexanediol; poly(hexamethylene adipate) glycol, and mixtures thereof. The hydrocarbon chain can have saturated or unsaturated bonds or substituted or unsubstituted aromatic and cyclic groups. In some embodiments, polycaprolactone polyols may be included in the polyurethane material. Suitable polycaprolactone polyols include, but are not limited to, 1,6-hexanediol-initiated polycaprolactone, diethylene glycol initiated polycaprolactone, trimethylol propane initiated polycaprolactone polyol triol, neopentyl glycol initiated polycaprolactone, 1,4-butanediol-initiated polycaprolactone, and mixtures thereof. The hydrocarbon chain can have saturated or unsaturated bonds or substituted or unsubstituted aromatic and cyclic groups. In some embodiments, polycarbonate glycols may be included in the polyurethane material. Suitable polycarbonates may include, but are not limited to, polyphthalate carbonate and poly(hexamethylene carbonate) glycol. The hydrocarbon chain can have saturated or unsaturated bonds or substituted or unsubstituted aromatic and cyclic groups. In some embodiments, the molecular weight of the polyol may be from about 200 to about 4000.

There are two standard techniques that may be used to make polyurethanes: a one-shot technique, and a prepolymer technique. In the one-shot technique, the diisocyanate, polyol, and/or hydroxyl-terminated chain extender (curing agent) are reacted in one step. In the prepolymer technique, a first reaction between the diisocyanate and polyol compounds produces a polyurethane prepolymer and a subsequent reaction between the prepolymer and hydroxyl-terminated chain-extender occurs. As a result of the reaction between the isocyanate and polyol compounds, there may be some unreacted NCO groups in the polyurethane prepolymer. The prepolymer may have less than 14 weight % (wt. %) unreacted NCO groups, less than 8.5 wt. % unreacted NCO groups, or from 2.5 wt. % to 8 wt. % unreacted NCO groups.

Either the one-shot or prepolymer method may be employed to produce cover layer compositions of the present disclosure. In some embodiments, the one-shot method is used, wherein the isocyanate compound is added to a reaction vessel and then a curative mixture comprising the polyol and curing agent is added to the reaction vessel. The components are mixed so that the molar ratio of isocyanate groups to hydroxyl groups may be in the range of about 1.00:1.00 to about 1.10:1.00. In some embodiments, the prepolymer method is used. The prepolymer technique generally may provide improved control of the chemical reaction via a homogeneous mixture that may result in a consistent polymer composition.

The polyurethane compositions can be formed by chain-extending the polyurethane prepolymer with a single chain-extender or blend of chain-extenders as described further below. As described above, the polyurethane prepolymer can be chain-extended by reacting it with a single chain-extender or a blend of chain-extenders. Generally, the prepolymer can be reacted with hydroxyl-terminated curing agents, amine-terminated curing agents, and mixtures thereof. The curing agents extend the chain length of the prepolymer and build-up its molecular weight.

A catalyst may be employed to promote the reaction between the isocyanate and polyol compounds for producing the prepolymer in the one-shot method or between prepolymer, hydroxyl-terminated curing agent, and amine-terminated curing agent in the prepolymer method. The catalyst may be added to the reactants before the reaction. Suitable catalysts include, but are not limited to, bismuth catalyst, zinc octoate, stannous octoate, dibutyl tin dilaurate, bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, di-n-octyltin bis-isooctyl mercaptoacetate and other tin catalysts, amine catalysts such as triethylenediamine, triethylamine, and tributylamine, organic acids such as oleic acid, fumaric acid, benzoic acid, octanoic acid, oxalic acid, crotonic acid, and acetic acid, delayed catalysts (e.g., Niax A-300 and Niax A-400), and mixtures thereof. The catalyst may be added in an amount sufficient to catalyze the reaction of the components in the reactive mixture. In some embodiments, the catalyst may be present in an amount from about 0.001 wt. % to about 1 wt. %, and preferably 0.1 to 0.5 wt. % of the composition.

The hydroxyl chain-extending (curing) agents may be comprise at least one of CAPA® 3031, CAPA® 4101, CAPA® 3091, ethylene glycol, diethylene glycol, polyethylene glycol, propylene glycol, 2-methyl-1,3-propanediol, 2-methyl-1,4-butanediol, monoethanolamine, diethanolamine, triethanolamine, monoisopropanolamine, diisopropanolamine, dipropylene glycol, polypropylene glycol (PPG), 1,2-butanediol, 1,3-butanediol, 1,4-butanediol, 2,3-butanediol, 2,3-dimethyl-2,3-butanediol, trimethylolpropane, cyclohexyldimethylol, triisopropanolamine, N,N,N',N'-tetra-(2-hydroxypropy.)-ethylene diamine, diethylene glycol bis-(aminopropyl) ether, 1,5-pentanediol, 1,6-hexanediol, 1,3-bis-(2-hydroxyethoxy) cyclohexane, 1,4-cyclohexyldimethylol, 1,3-bis-[2-(2-hydroxyethoxy) ethoxy] ethoxy}cyclohexane, trimethylolpropane, polytetramethylene ether glycol (PTMEG), preferably having a molecular weight from about 250 to about 3900, or mixtures thereof.

Amine chain-extending (curing) agents that may be used in chain-extending the polyurethane prepolymer may include, but are not limited to, Lonzacure DETDA 80 LC (Lonza 80LC), unsaturated diamines such as 4,4'-diamino-diphenylmethane (e.g., 4,4'-methylene-dianiline or "MDA"); m-phenylenediamine; p-phenylenediamine; 1,2- or 1,4-bis(sec-butylamino)benzene; 3,5-diethyl-(2,4- or 2,6-) toluenediamine or "DETDA"; 3,5-dimethylthio-(2,4- or 2,6-)toluenediamine; 3,5-diethylthio-(2,4- or 2,6-)toluenediamine; 3,3'-dimethyl-4,4'-diaminodiphenylmethane; 3,3'-diethyl-5,5'-dimethyl 4,4'-diaminodiphenylmethane (e.g., 4,4'-methlene-bis(2-ethyl-6-methyl-benezeneamine); 3,3'-dichloro-4,4'-diamino-diphentylmethane (e.g., 4,4'-methylene-bis(2-chloroaniline) or "MOCA"); 3,3'5,5'-tetraethyl-4,4'-diamino-diphenylmethane (e.g., 4,4'-methylene-bis(2,6-diethylaniline)); 2,2'-dichloro-3,3',5,5'-tetraethyl-4,4'-diamino-diphenylmethane (e.g., 4,4'-methylene-bis(3-chloro-2,6-diethyleneaniline) or "MCDEA"); 3,3'-diethyl-5,5'-dichloro-4,4'-diamino-diphenylmethane, or "MDEA"); 3,3'-dichloro-2,2'6,6'-tetraethyl-4,4'-diamino-diphenylmethane; 3,3'-dichloro-4,4'-diamino-diphenylmethane; 4,4'-methylene-bis(2,3-dichloroaniline) (e.g., 2,2'3,3'-tetrachloro-4,4'-diamino-diphenylmethane or "MDCA"); and mixtures thereof. The amine curing agents used as chain extenders normally have a cyclic structure and a low molecular weight of 250 or less.

When the polyurethane prepolymer is reacted with hydroxyl-terminated curing agents during the chain-extending step, as described above, the resulting polyurethane composition contains urethane linkages. When the polyurethane prepolymer is reacted with amine-terminated curing agents during the chain-extending step, any excess isocyanate groups in the prepolymer will react with the amine groups in the curing agent. Isocyanate groups may be considered chemical bonding or reaction sites for the prepolymer technique and may also be related to the cure state, or hardness, of the product from the reaction mixture. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with the hydroxyl-terminated curing agents during the chain-extending step, as described above, the resulting composition is essentially a pure polyurethane composition containing urethane linkages having the following general structure:

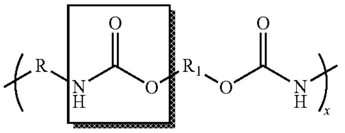

Urethane linkage

Where x is the chain length, about 1 or greater, and R and $R_1$ are straight chain or branched hydrocarbon chains having about 1 to about 20 carbons.

When the polyurethane prepolymer is reacted with an amine-terminated curing agent during the chain-extending step, any excess isocyanate groups in the prepolymer will react with the amine groups in the curing agent and create urea linkages having the following general structure:

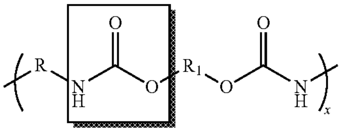

Urea linkage

Where x is the chain length, about 1 or greater, and R and R1 are straight chain or branched hydrocarbon chains having about 1 to about 20 carbons.

Polyurethane compositions used to form a cover layer may contain other polymer materials including, for example: aliphatic or aromatic polyurethanes; aliphatic or aromatic polyureas; aliphatic or aromatic polyurethane/urea hybrids; olefin-based copolymer ionomer compositions; polyethylene (e.g., low density polyethylene, linear low-density polyethylene, and high density polyethylene); polypropylene; rubber-toughened olefin polymers; acid copolymers; plastomers; flexomers; styrene/butadiene/styrene block copolymers; dynamically vulcanized elastomers; copolymers of ethylene and vinyl acetates; copolymers of ethylene and methyl acrylates; polyvinyl chloride resins; polyamides; poly(amide-ester) elastomers; graft copolymers of ionomer and polyamide; cross-linked trans-polyisoprene and blends thereof; polycarbonate/polyester blends; maleic anhydride-grafted polymers; and mixtures of the foregoing materials.

In addition, the polyurethane compositions may contain fillers, additives, and other ingredients that do not detract from the properties of the final composition. The additional materials may include, but are not limited to, catalysts, wetting agents, coloring agents, optical brighteners, cross-linking agents, whitening agents (e.g., titanium dioxide, zinc oxide, etc.), ultraviolet light absorbers, hindered amine light stabilizers, fluorosurfactants, defoaming agents, processing aids, surfactants, and other conventional additives. Other suitable additives may include antioxidants, stabilizers, softening agents, plasticizers, including internal and external plasticizers, impact modifiers, foaming agents, density-adjusting fillers, reinforcing materials, compatibilizers, and the like. Some examples of fillers may include zinc oxide, zinc sulfate, barium carbonate, barium sulfate, calcium oxide, calcium carbonate, clay, tungsten, tungsten carbide, silica, and mixtures thereof. The additives may be present in the composition in an amount between about 1 to about 70 weight percent based on total weight of the composition depending upon the desired properties.

Forming a Cover Layer

The polyurethane and polyurea compositions of the present disclosure may be applied over an inner ball or sub-assembly using a variety of application techniques including, but not limited to, spraying, compression molding, dipping, spin coating, or flow coating methods. In some embodiments, the polyurethane or polyurea composition may be used to form a cover over the core using a combination of casting and compression molding.

In some embodiments, a formulation to make a cover material may comprise an isocyanate prepolymer, a curative, a first catalyst, and a second catalyst. In some embodiments, the curative may be amine-based such as Ethacure 300, Ethacure 100, Unilink 4200, Versalink, Omicure 33DS, m-Xylylenediamine (MXDA), or 4,4'-Methylenebis(2-chloroaniline) (MOCA). In some embodiments, the curative may be hydroxyl-based, CAPA 3031, CAPA 3090, CAPA 4101, 1,4-Butanediol (1,4-BDO), or 1,6 hexane diol. In some embodiments, the formulation may comprise both an amine-based curative and a hydroxyl-based curative. In some embodiments, the formulation may comprise an organic catalyst. In some embodiments, the formulation may comprise a metal-based catalyst. In some embodiments, the formulation may comprise both an organic catalyst and a metal-based catalyst. The amine-based curative may be Lonza 80LC. The hydroxyl-based curative may be CAPA 3031. The organic catalyst may be acetic acid. The metal-based catalyst may be dibutyl tin dilaurate. In some embodiments, the prepolymer may contain an excess of isocyanate.

Golf balls constructed in accordance with disclosed methods may be formed using a variety of application techniques. For example, the golf ball, golf ball core, or any layer of the golf ball may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. In this aspect, cover layers may be formed over the core using any suitable technique that is associated with the material used to form the layer. Preferably, each cover layer is separately formed over the core. For example, an ethylene acid copolymer ionomer composition may be injection-molded to produce half-shells over the core. Alternatively, the ionomer composition can be placed into a compression mold and molded under sufficient pressure, temperature, and time to produce the hemispherical shells, which may then be placed around the core in a compression mold. An outer cover layer including a polyurethane or polyurea composition over the ball sub-assembly may be formed by using a casting process.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding.

U.S. Pat. No. 5,733,428, the entire disclosure of which is hereby incorporated by reference, discloses a method for forming a polyurethane cover on a golf ball core.

Once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted, and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present disclosure.

Examples of yet other materials which may be suitable for incorporating and coordinating to target and achieve desired playing characteristics or feel include polyalkenamer compositions, transparent or plasticized polyamides, thiolene compositions, polyamide and anhydride-modified polyolefins, organic acid-modified polymers, and the like.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and topcoats), which may contain a fluorescent whitening agent, may be applied to the cover. Golf balls may also be painted with one or more paint coatings in a variety of colors. In one embodiment, white primer paint is applied first to the surface of the ball and then a white top-coat of paint may be applied over the primer.

A golf ball constructed in accordance with disclosed embodiments may also incorporate indicia such as any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more-layer core. In any of these embodiments, the cover layer may be replaced with a 2 or more-layer cover.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls constructed as described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the disclosure(s) set forth herein.

EXAMPLES

The following non-limiting examples are merely illustrative of embodiments of the present disclosure and are not to be construed as limiting the disclosure, the scope of which is defined by the appended claims. Parts are by weight percent of a total composition unless otherwise indicated.

Example 1: Formulations

Table 1 below illustrates formulations according to the present disclosure. Each component may be as described above.

| | Formulation ID | | | | | |
|---|---|---|---|---|---|---|
| | 1 | 2 | 3 | 4 | 5 | 6 |
| Prepolymer | S2702709 @ 5.5% NCO (70/30 W/N-3400 with PTMEG 2000) | | | | | |
| Amine-base curative | 80% | | 60% | | 40% | |
| Hydroxyl-based curative | 20% | | 40% | | 60% | |
| First catalyst | 0.075% | | 0.075% | | 0.075% | |
| Second catalyst | 0 | 0.075% | 0 | 0.075% | 0 | 0.075% |

It is appreciated that Formulations 2, 4, and 6 may each refer to a dual catalyst formulation, whereas Formulations 1, 3, and 5 may each refer to a single catalyst formulation, or a comparative formulation. Formulations are mixed according to the weight percentages in Table 1 and allowed to cure. Material property values are determined for each Formulation over the duration of the cure.

Example 2: Material Property Development of Formulations Over Time

The material property values for a dual catalyst formulation over the duration of the cure (e.g., time) is illustrated in FIG. 1. As seen in FIG. 1, the material property 102 for dual catalyst formulation is plotted over time 101. Material property 102 may be an indication of the state of cure of the dual catalyst formulation. In some embodiments, material property 102 is a material strength. In some embodiments, material property 102 is a consistency of a formulation. The time scale considered in FIG. 1 is relative and may span hours up to days from the initiation of curing a dual catalyst formulation. FIG. 1 demonstrates the presence of two catalysts can manipulate the cure profile of a formulation. For example, the first catalyst in a dual catalyst formulation initiates the front-end cure and material property 102 rapidly increases. When material property 102 reaches a threshold material property value 103, the dual catalyst formulation may have a satisfactory material property for subsequent processing. Threshold material property value 103 may accordingly be the Green strength 103. For making a golf ball cover, the golf ball may be demolded once Green strength 103 is achieved. The front-end cure 104 is represented by time period between the start of curing and the time at which Green strength 103 is achieved. After the Green strength 103 is reached, the formulation still cures according to the back-end cure 105. Back-end cure 105 is the time period in which a formulation fully cures after Green strength 103 is achieved. The second catalyst of the formulation may decrease a rate of the back-end cure, which is illustrated in FIG. 1 with the solid line exhibiting a lower slope (e.g., slower increase in material property value 102). The second catalyst may be slower acting than the first catalyst, so material property value 102 may increase more slowly over time 101 in the back-end cure compared to the front-end cure. Accordingly, a material property of a dual catalyst formulation may increase at a slower rate and provide a larger time window for mechanically processing the dual catalyst formulation. The dotted line 106 represents a comparative formulation that does not contain a second catalyst. Accordingly, the back-end cure of the comparative is more rapid than the back-end cure of the dual catalyst formulation, which is illustrated as dotted line 106 exhibiting a larger slope than the solid line. Thus, embodiments of the present disclosure may provide greater control and manipulation of a cure profile of an elastomer. Gross differences in hardness of a material may be achieved with minimal changes to the chemical formulation, such as molecular weight, isocyanate, and curatives.

Figure 2:
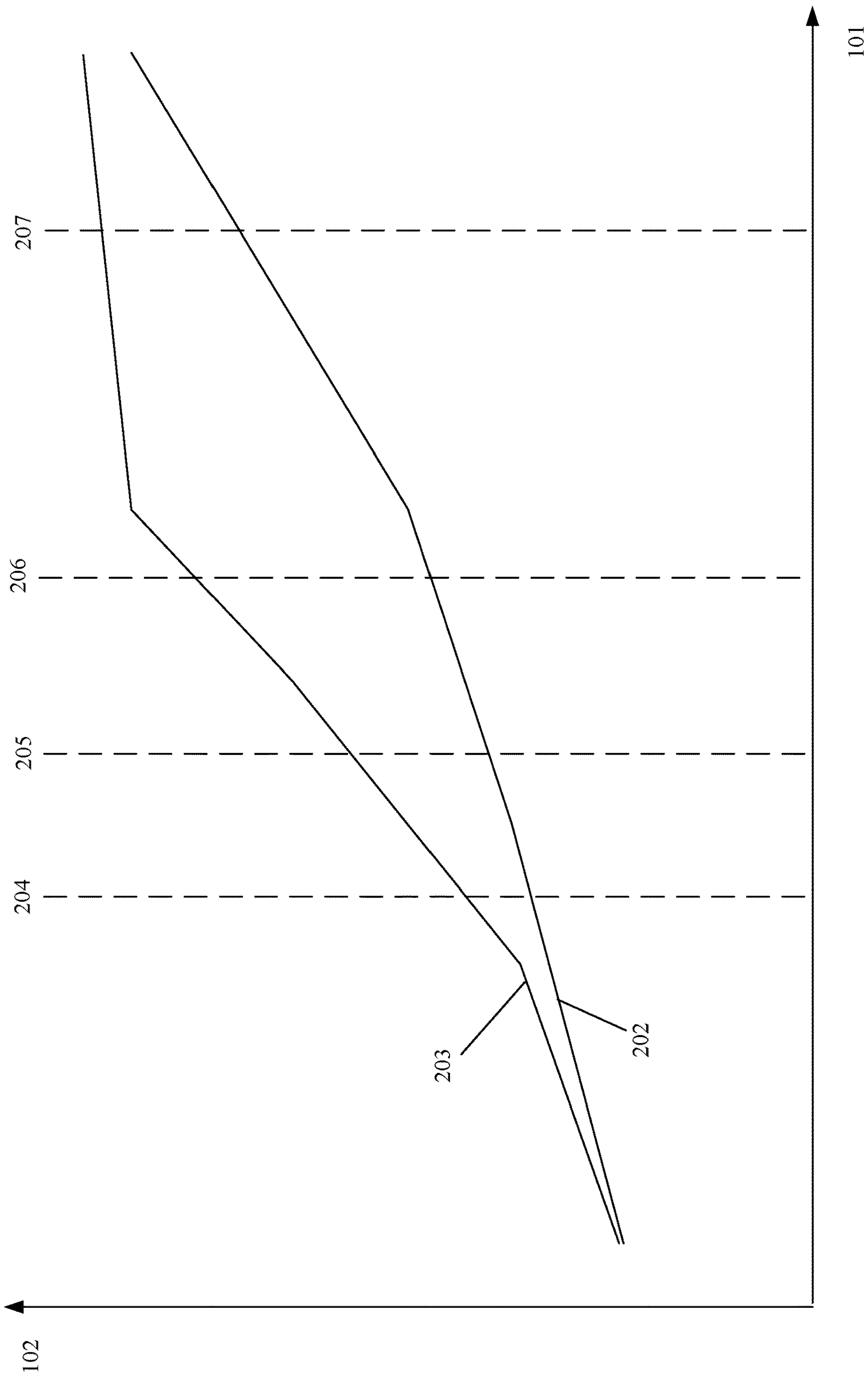
FIG. 2 is an extended material property profile plotted over cure time for a formulation, consistent with embodiments of the present disclosure.

It is appreciated that FIG. 1 is for illustrative purposes, and the front-end cure and back-end cure may not be represented by continuous linear lines. Reference is now made to FIG. 2, which is an example comparison between the back-end cure for an embodiment of this disclosure, a dual catalyst formulation, and a comparative formulation without a second catalyst. As seen in FIG. 2, both dual catalyst formulation 202 and comparative formulation 203 exhibit a similar material property value 102 at the start of the back-end cure. This again indicates the presence of the second catalyst in dual catalyst formulation 202 does not impact the front-end cure. However, comparative formulation 203 exhibits an earlier and more rapid increase in material property development 102 compared to dual catalyst formulation 202 in the back-end cure. Each dotted line in FIG. 2 represents a manufacturing processing step that may be applied to a curing golf ball cover in this timeframe. Dotted line 204 represents a buffing step to buff a connecting line between golf ball cover halves, dotted line 205 represents a reforming step of dimples on a golf ball cover, dotted line 206 represents applying a primer paint and indicia onto a golf ball cover, and dotted line 207 represents applying a clear coat onto a golf ball cover. It can be clearly seen in FIG. 2 that dual catalyst formulation 202 is less cured than comparative formulation 203 at each dotted line 204-207, and thus exhibits a lower material property value 102. The slower cure exhibited by dual catalyst formulation 202 may facilitate greater ease in manufacturing process steps 204-207, compared to the more drastically cured comparative formulation 203. For example, comparative formulation 203 may exhibit too large of a material property value 102 such that the casted formulation is undesirably difficult to process in a manufacturing process step. At buffing step 204, comparative Formulation 203 may be too brittle for buffing the connecting line and be damaged. At step 205 (reforming or applying dimples to a golf ball cover), comparative Formulation 203 may be too hard to easily perform this step. At either step 206 or 207, comparative Formulation 203 may exhibit a cure state such that the paint isolates into islands and does not disperse evenly. The slower cure provided by the second catalyst used in dual catalyst formulation 202 compared to comparative formulation 203 may thus provide greater flexibility and versatility in subsequent processing in manufacturing. It is appreciated that a process step may be dependent on the formulation chemistry and a related chemical or physical property of the cured cover material.

Example 3: Isocyanate Concentrations after Curing

Figure 3:
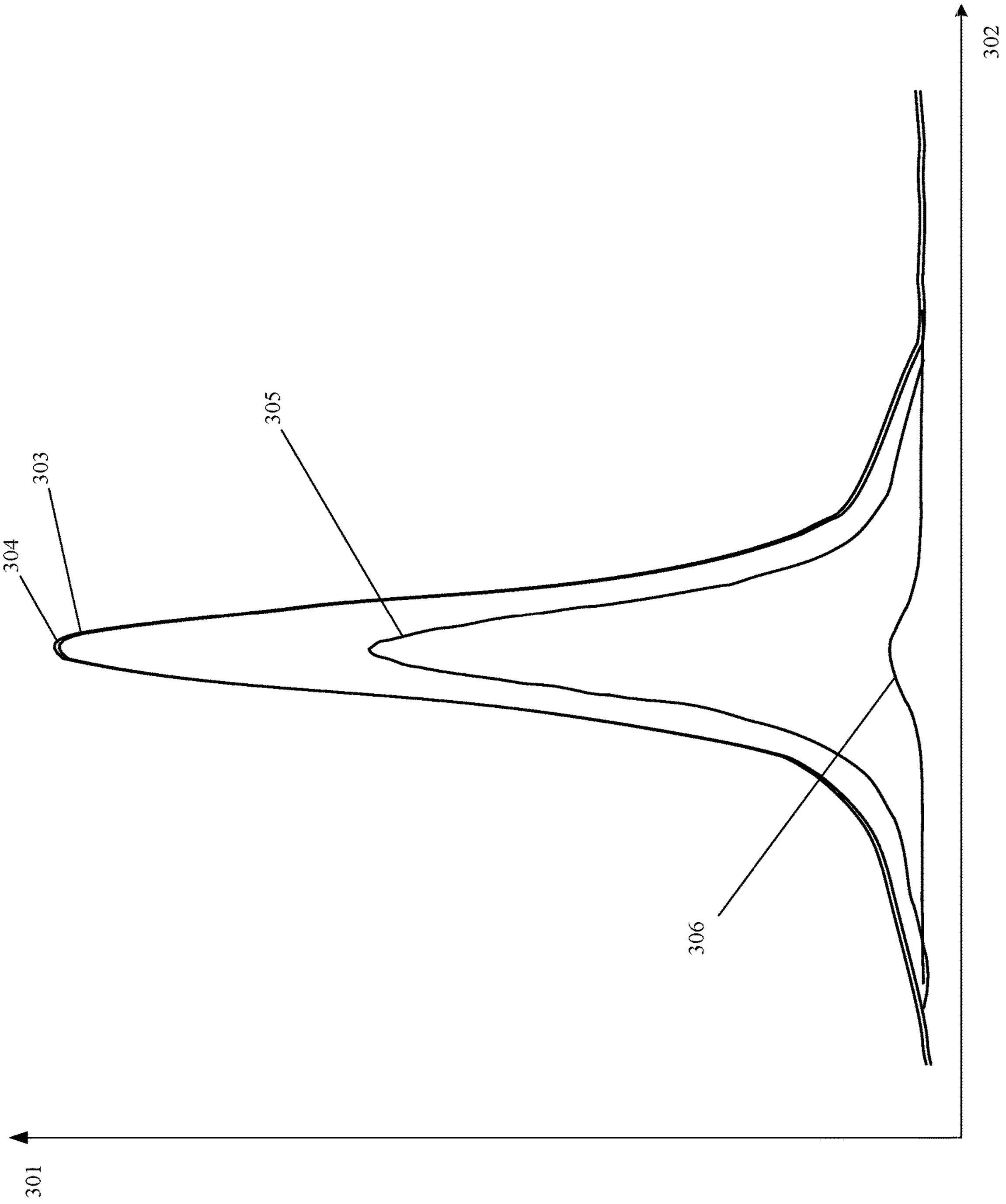
FIG. 3 is a comparison of FTIR results of formulations at an onset of a back-end cure and after 20 hours of curing, consistent with embodiments of the present disclosure.

Reference is now made to FIG. 3, which is an accumulation of Fourier transform infrared (FTIR) results of cured formulations of the present disclosure. The FTIR results are obtained for a dual catalyst formulation and a comparative formulation with a single catalyst after initiating a back-end cure and after 20 hours from starting a back-end cure. The FTIR results are plotted such that the y-axis 301 represents absorbance and the x-axis 302 represents wavenumber ($cm^{-1}$). As discussed above, NCO in a formulation may provide extra chemical bonding sites that present during cover layer fabrication and may provide increased adhesion for subsequent layers applied during a process step in manufacturing (e.g., adding a paint layer). Furthermore, the NCO peak intensity may indicate the state of cure for a formulation. NCO may be consumed during the curing reaction, and a FTIR result with a negligible NCO peak intensity may indicate a fully cured formulation. The peaks illustrated in FIG. 3 correspond to NCO, at around 2265 $cm^{-1}$. A greater intensity of an NCO peak in FIG. 3 indicates a greater concentration or presence of NCO in a formulation, and thus a formulation is available for chemical reaction or processing. A weaker intensity of an NCO peak in FIG. 3 indicates a smaller concentration of NCO in the formulation, and thus a formulation is less available for chemical reaction or processing. For example, FTIR plots 303 and 304 represent a dual catalyst formulation (e.g., dual catalyst formulation 202 in FIG. 2) and comparative formulation (e.g., comparative formulation 203 in FIG. 2) at the start of the back-end cure. The NCO peaks are similar in intensity, which corresponds to FIG. 2. However, after 20 hours of curing, the FTIR plot for the comparative formulation, FTIR plot 306, is significantly decreased in intensity compared to that of the dual catalyst formulation, FTIR plot 305. A 20-hour cure may correspond to the time point in FIG. 2 where primer paint may be applied to a golf ball cover (e.g., process step 206 in FIG. 2). As was observed in FIG. 2, the material property value of dual catalyst formulation 202 at the same time was significantly lower than that of the comparative formulation 203. Referring back to FIG. 3, the NCO concentration present in the comparative formulation is significantly lower than the NCO concentration present in the dual catalyst formulation. Thus, a dual catalyst formulation exhibits a delayed cure with a longer window of chemical processing available in a back-end cure compared to a comparative formulation with a single catalyst.

What is claimed is:

1. A method for manipulating a cure profile of an elastomer, the method comprising:

providing a formulation comprising an isocyanate prepolymer, a curative, a first catalyst, and a second catalyst, wherein the second catalyst acts as a negative catalyst;

initiating a front-end cure reaction between the isocyanate prepolymer and the curative with the first catalyst; and decreasing a rate of a back-end cure reaction between the isocyanate prepolymer and the curative using the second catalyst while avoiding an impact on the front-end cure reaction.

2. The method of claim 1, wherein the front-end cure reaction is completed within 2 hours.

3. The method of claim 1, wherein the curative contains at least one selected from the group of an amine-based curative, a hydroxyl-based curative, and combinations thereof.

4. The method of claim 3, wherein the amine-based curative comprises at least one of m-Xylylenediamine (MXDA), or 4,4'-Methylenebis(2-chloroaniline) (MOCA), and the hydroxyl-based curative comprises at least one of a polycaprolactone, polypropylene glycol (PPG), polytetramethylene ether glycol (PTMEG), 1,4 BDO, or 1,6 hexane diol.

5. The method of claim 1, wherein the second catalyst further acts as a delay catalyst.

6. The method of claim 1, wherein the second catalyst extends a cure time of the elastomer.

7. The method of claim 1, wherein the first catalyst is an organic-based catalyst comprising at least one of oleic acid, fumaric acid, benzoic acid, octanoic acid, oxalic acid, crotonic acid, or acetic acid.

8. The method of claim 1, wherein the second catalyst is a metal-based catalyst comprising at least one of bismuth catalyst, zinc octoate, stannous octoate, dibutyl tin dilaurate, bis-butyltin dilaurate, bis-butyltin diacetate, tin (II) chloride, tin (IV) chloride, bis-butyltin dimethoxide, dimethyl-bis[1-oxonedecyl)oxy]stannane, or di-n-octyltin bis-isooctyl mercaptoacetate.

9. A method of forming a golf ball cover, the method comprising:

providing a golf ball comprising at least one core layer;

providing a formulation comprising an isocyanate prepolymer, a curative, a first catalyst, and a second catalyst, wherein the second catalyst acts as a negative catalyst;

casting a cover from the formulation about the golf ball, wherein the formulation cures by the first catalyst initiating a front-end cure reaction between the isocyanate prepolymer and the curative;

demolding the golf ball once the front-end cure reaction is completed; and performing a manufacturing process step to the cover during a back-end cure reaction between the isocyanate prepolymer and the curative;

wherein the second catalyst decreases a rate of the back-end cure reaction of the formulation while avoiding an impact on the front-end cure reaction.

10. The method of claim 9, wherein the front-end cure reaction is completed within 2 hours.

11. The method of claim 9, wherein the curative contains at least one selected from the group of an amine-based curative, a hydroxyl-based curative, and combinations thereof.

12. The method of claim 11, wherein the amine-based curative comprises MXDA, or MOCA, and the hydroxyl-based curative comprises, a polycaprolactone, PPG, PTMEG, 1,4 BDO, or 1,6 hexane diol.

13. The method of claim 9, wherein the second catalyst further acts as a delay catalyst.

14. The method of claim 9, wherein the second catalyst extends a time window for chemical processing to the golf ball cover.

15. The method of claim 9, wherein the manufacturing process step comprises adding a layer to the golf ball cover or mechanically manipulating the shape or surface of the golf ball cover.

16. The method of claim 15, wherein the added layer is a paint layer.

17. The method of claim 9, wherein the first catalyst is an organic-based catalyst comprising at least one of oleic acid, fumaric acid, benzoic acid, octanoic acid, oxalic acid, crotonic acid, or acetic acid.

18. The method of claim 9, wherein the second catalyst is a metal-based catalyst comprising at least one of bismuth catalyst, zinc octoate, stannous octoate, dibutyl tin dilaurate, bis-butyltin dilaurate, bis-butyltin diacetate, tin (II) chloride, tin (IV) chloride, bis-butyltin dimethoxide, dimethyl-bis[1-oxonedecyl)oxy]stannane, or di-n-octyltin bis-isooctyl mercaptoacetate.

* * * * *